United States Patent
Horie et al.

(10) Patent No.: US 11,472,130 B2
(45) Date of Patent: Oct. 18, 2022

(54) METHOD OF MANUFACTURING COMPOSITE MEMBER AND THE COMPOSITE MEMBER

(71) Applicants: The University of Tokyo, Tokyo (JP); The Foundation for the Promotion of Industrial Science, Tokyo (JP)

(72) Inventors: Nayuta Horie, Toyokawa (JP); Eiji Yamaguchi, Toyokawa (JP); Yusuke Kajihara, Tokyo (JP); Fuminobu Kimura, Tokyo (JP); Gota Suzuki, Tokyo (JP)

(73) Assignees: The University of Tokyo, Tokyo (JP); The Foundation for the Promotion of Industrial Science, Tokyo (JP)

( * ) Notice: Subject to any disclaimer, the term of this patent is extended or adjusted under 35 U.S.C. 154(b) by 185 days.

(21) Appl. No.: 16/788,963

(22) Filed: Feb. 12, 2020

(65) Prior Publication Data
US 2020/0262157 A1   Aug. 20, 2020

(30) Foreign Application Priority Data
Feb. 15, 2019   (JP) ............................. JP2019-025320

(51) Int. Cl.
*B29C 65/00*   (2006.01)
*B32B 15/08*   (2006.01)
(Continued)

(52) U.S. Cl.
CPC ............ *B29C 66/7422* (2013.01); *B32B 3/06* (2013.01); *B32B 7/10* (2013.01); *B32B 15/08* (2013.01);
(Continued)

(58) Field of Classification Search
CPC ......... B24C 1/06; B24C 7/0061; B24C 9/003; B29C 2045/14868; B29C 2045/14885;
(Continued)

(56) References Cited

U.S. PATENT DOCUMENTS 4,223,074 A * 9/1980 Yoshida ................. B32B 15/20
156/273.5
2006/0257624 A1* 11/2006 Naritomi .................. B32B 3/30
428/458
(Continued)

FOREIGN PATENT DOCUMENTS

JP       02036917 A  * 2/1990   ....... B29C 45/14311
JP    2010284899 A  * 12/2010  ....... B29C 45/14311
(Continued)

*Primary Examiner* — Philip C Tucker
*Assistant Examiner* — Brian R Slawski
(74) *Attorney, Agent, or Firm* — Faegre Drinker Biddle & Reath LLP

(57) ABSTRACT

A method of manufacturing a composite member including an aluminum member and a resin member bonded to each other, the method including: performing blasting on a surface of the aluminum member; modifying the surface of the aluminum member into aluminum hydroxide, the modifying including causing the surface of the aluminum member having undergone blasting to react with water by using at least one of heat and plasma; and directly bonding the resin member to the surface of the aluminum member modified to the aluminum hydroxide.

17 Claims, 14 Drawing Sheets

(51) Int. Cl.
    *B32B 15/20*    (2006.01)
    *B32B 7/10*     (2006.01)
    *B32B 38/00*    (2006.01)
    *B32B 3/06*     (2006.01)
    *B29C 37/00*    (2006.01)
    *B29C 65/72*    (2006.01)
    *B29C 65/70*    (2006.01)
    *B29C 45/14*    (2006.01)
    *B29C 65/64*    (2006.01)

(52) U.S. Cl.
    CPC .......... *B32B 15/20* (2013.01); *B32B 38/0012* (2013.01); *B29C 37/0082* (2013.01); *B29C 45/14311* (2013.01); *B29C 65/64* (2013.01); *B29C 65/70* (2013.01); *B29C 65/72* (2013.01); *B29C 66/026* (2013.01); *B29C 66/028* (2013.01); *B29C 66/02245* (2013.01); *B29C 66/30325* (2013.01); *B29C 66/712* (2013.01); *B29C 2045/14868* (2013.01); *B32B 2038/0016* (2013.01)

(58) Field of Classification Search
    CPC ............... B29C 45/14; B29C 45/14311; B29C 37/0082; B29C 65/56; B29C 65/64; B29C 65/70; B29C 65/72; B29C 66/7422; B29C 66/02245; B29C 66/026; B29C 66/028; B29C 66/30325; B29C 66/712; B29K 2705/02; B32B 15/08; B32B 15/20; B32B 2038/0016; B32B 2038/002; B32B 38/0012; B32B 3/06; B32B 7/10
    USPC ......... 156/60, 153, 272.2, 272.6, 73.6, 73.1, 156/242, 245; 428/411.1, 457, 469, 472.2
    See application file for complete search history.

(56) References Cited

U.S. PATENT DOCUMENTS

| | | | |
|---|---|---|---|
| 2009/0035589 A1* | 2/2009 | Lee | B29C 45/14311 |
| | | | 428/457 |
| 2012/0231281 A1* | 9/2012 | Hirai | B32B 15/08 |
| | | | 428/447 |
| 2014/0234631 A1* | 8/2014 | Iino | C23C 22/73 |
| | | | 428/419 |
| 2015/0217545 A1* | 8/2015 | Endo | B29C 65/8215 |
| | | | 156/151 |
| 2015/0273795 A1* | 10/2015 | Koizumi | B32B 7/04 |
| | | | 428/447 |
| 2019/0054672 A1* | 2/2019 | Kajihara | B32B 15/082 |

FOREIGN PATENT DOCUMENTS

| | | | | |
|---|---|---|---|---|
| JP | 2011121306 A | * | 6/2011 | ....... B29C 45/14311 |
| JP | 2018-099782 A | | 6/2018 | |
| JP | 2018-164988 A | | 10/2018 | |
| WO | WO-2016199339 A1 | * | 12/2016 | ............... B05D 3/10 |
| WO | WO-2017141381 A1 | * | 8/2017 | ....... B29C 45/14311 |

* cited by examiner

METHOD OF MANUFACTURING COMPOSITE MEMBER AND THE COMPOSITE MEMBER

CROSS-REFERENCE TO RELATED APPLICATIONS

This application is based on and claims the benefit of priority from Japanese Patent Application No. 2019-025320 filed on Feb. 15, 2019, and the entire contents of which are incorporated herein by reference.

TECHNICAL FIELD

The present disclosure relates to a method of manufacturing a composite member and the composite member.

BACKGROUND

WO 2017/141381 discloses a method of manufacturing a composite member. In this method, the composite member is manufactured using a base material and a resin member that are bonded to each other. On a surface of the base material, micro-order or nano-order asperities are formed. A resin member is applied into the micro-order or nano-order asperities and is cured therein, producing an enhanced anchor effect as compared with millimeter-order asperities. Thus, the composite member manufactured by this method has high bonding strength.

SUMMARY

Aluminum is lighter and stronger than iron. Thus, aluminum is used as various components and is important as a base material of a composite member. The manufacturing method described in WO 2017/141381 is susceptible to improvement in view of improvement in the bonding strength of the composite member including the base material of aluminum.

According to an aspect of the present invention, a method of manufacturing a composite member is provided, the composite member comprising an aluminum member and a resin member that are bonded to each other. The manufacturing method includes performing blasting, modifying, and bonding. In the performing blasting, blasting is performed on the surface of the aluminum member. In the modifying, the surface of the aluminum member is modified into aluminum hydroxide. In the modifying, the surface of the aluminum member having undergone blasting is caused to react with water by using at least one of heat and plasma. In the bonding, the resin member is directly bonded to the surface of the aluminum member modified to the aluminum hydroxide.

According to the manufacturing method, blasting is performed on the surface of the aluminum member. Asperities are formed on the surface of the aluminum member having undergone blasting. The asperities contribute to an anchor effect. However, the asperities are formed by a collision of a blast material and thus have sharp projections. The sharp projections may break the resin member. According to the manufacturing method, the surface of the aluminum member having undergone blasting is modified into the aluminum hydroxide. Thus, the sharp projections are rounded. The resin member is directly bonded to the surface of the aluminum member modified to the aluminum hydroxide. The resin member is applied into the rounded asperities and is cured therein. As described above, according to the manufacturing method, sharp projections that may break the resin member can be removed by the modifying, thereby improving the bonding strength of the composite member. Moreover, on the surface of the aluminum member, an oxygen atom of a hydroxyl group in the aluminum hydroxide and a hydrogen atom contained in the resin form a hydrogen bond. Thus, a chemical bond is formed between the surface of the aluminum member and the resin member, thereby improving the bonding strength. Furthermore, the surface of the aluminum member composed of the aluminum hydroxide has pores of several tens to several hundreds nm. This can enhance the anchor effect.

According to an embodiment, the aluminum hydroxide may be boehmite.

According to the embodiment, the modifying may include cleaning the surface of the aluminum member with the water. When the surface of the aluminum member is contaminated with carbon, the contamination may reduce the wettability of a resin material and interfere with a chemical bond between the surface of the aluminum member and the resin member. With this configuration, the surface of the aluminum member is cleaned with water used for modification to aluminum hydroxide, thereby suppressing a reduction in bonding strength when the bonding strength is reduced by contamination with carbon.

According to the embodiment, the modifying may include causing the surface of the aluminum member to react with water by using one of hydrothermal treatment, steam treatment, superheated steam treatment, liquid plasma, and atmospheric-pressure plasma containing water. The surface of the aluminum member can be modified by the foregoing treatment.

According to the embodiment, abrasive grains used in the performing blasting may have a particle size of 30 μm to 710 μm. Thus, an oxide film formed on the surface of the aluminum member can be properly removed. This can form a uniform aluminum hydroxide film on the surface of the aluminum member.

According to another embodiment of the present disclosure, a composite member is provided. The composite member comprises: an aluminum member having asperities on the surface of the aluminum member and an aluminum hydroxide film formed on the surface of the aluminum member, and a resin member in direct contact with the surface of the aluminum member having the aluminum hydroxide film.

The composite member has the asperities on the surface of the aluminum member that is in direct contact with the resin member, thereby producing the anchor effect. Furthermore, the aluminum hydroxide film is formed on the surface of the aluminum member. An oxygen atom of the hydroxyl group of the aluminum hydroxide film and a hydrogen atom contained in resin form a hydrogen bond. Thus, a chemical bond is formed between the surface of the aluminum member and the resin member, thereby improving the bonding strength. Furthermore, the surface of the aluminum member having the aluminum hydroxide film has pores of several tens to several hundreds nm. This can enhance the anchor effect.

According to the embodiment, the aluminum hydroxide film may be made of boehmite.

According to an aspect and an embodiment of the present disclosure, a method of manufacturing a composite member having high bonding strength and a composite member having high bonding strength are provided.

DETAILED DESCRIPTION

Figure 1:
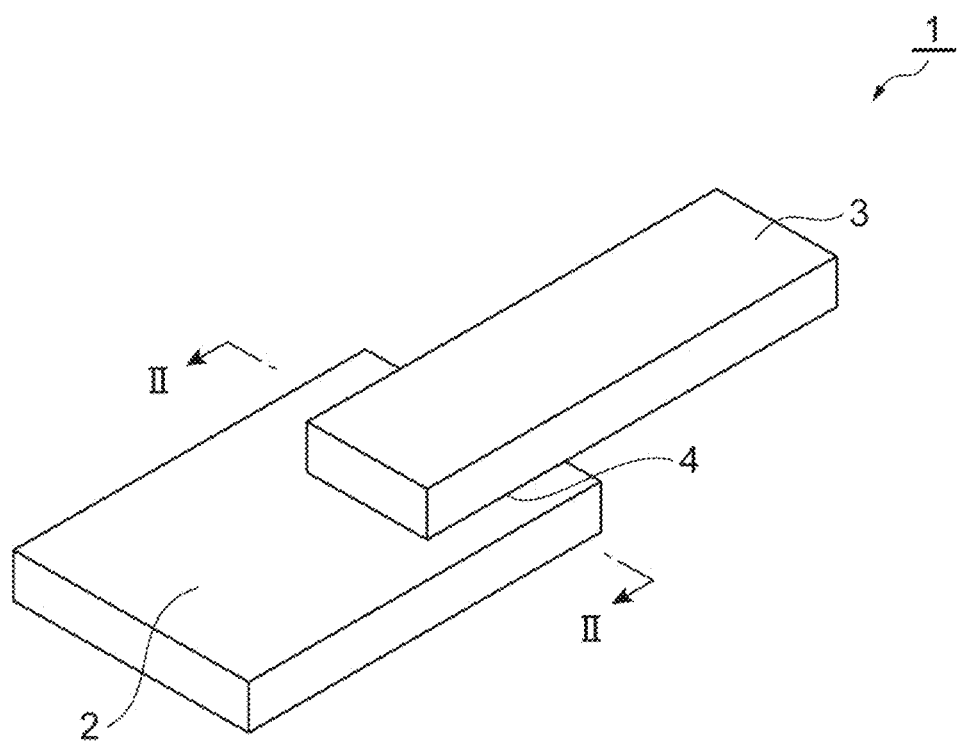
FIG. 1 is a perspective view illustrating a composite member according to an embodiment.

An embodiment will be described below with reference to the accompanying drawings. In the following explanation, the same or equivalent elements are indicated by the same reference numerals and a duplicate explanation thereof is omitted. Moreover, "bonding strength" in the present embodiment will be described as "shearing strength".

[Composite Member]

FIG. 1 is a perspective view illustrating a composite member 1 according to the embodiment. As illustrated in FIG. 1, the composite member 1 is a member including a plurality of members integrated by bonding. For example, the composite member 1 is a member including a resin member and a foreign member of the resin member, the resin and foreign members being bonded to each other. The foreign member of the resin member is a member made of materials having different characteristics from the materials of the resin member, such as a coefficient of thermal expansion, a coefficient of heat transfer, and strength.

The composite member 1 includes an aluminum member 2 and a resin member 3. The aluminum member 2 is, for example, a plate member. The resin member 3 is in direct contact with a surface of the aluminum member 2. In FIG. 1, the resin member 3 is in direct contact with a part of the surface of the aluminum member 2 (a contact surface 4 of the aluminum member 2) and has a lap joint structure. The material of the aluminum member 2 is aluminum or an aluminum alloy. The materials of the resin member 3 include resins such as polybutylene terephthalate, polyphenylene sulfide, polyamide, a liquid crystal polymer, polypropylene, and acrylonitrile-butadiene-styrene.

Figure 2:
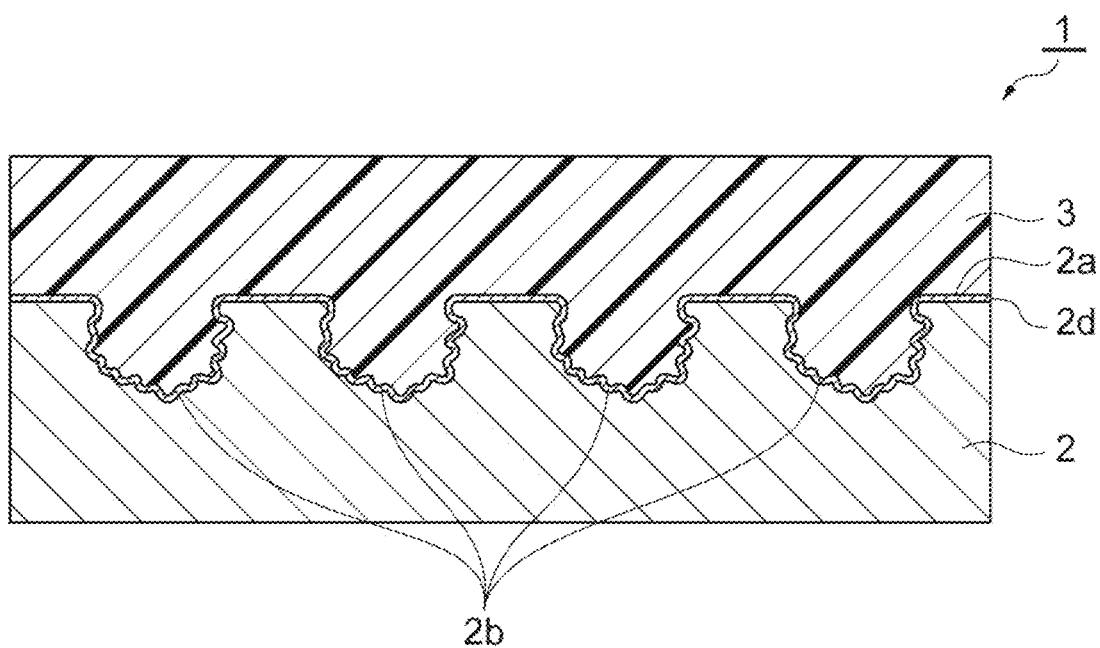
FIG. 2 is a cross-sectional view of the composite member taken along line II-II of FIG. 1.

FIG. 2 is a cross-sectional view of the composite member 1 taken along line II-II of FIG. 1. As illustrated in FIG. 2, the aluminum member 2 has asperities 2b on a part (contact surface 4) of the surface 2a. The asperities 2b are micro-order or nano-order asperities. The micro-order asperities are asperities having a height difference of 1 μm to less than 1000 μm. The nano-order asperities are asperities having a height difference of 1 nm to less than 1000 mm. The ends of the asperities 2b are chamfered. Thus, the asperities 2b are rounded and have no acute-angled points. The resin member 3 is fixed into the asperities 2b and thus produces an anchor effect.

Furthermore, an aluminum hydroxide film 2d is formed on the surface of the aluminum member 2. The aluminum hydroxide film 2d is a film made of aluminum hydroxide and has pores of several tens to several hundreds nm on the surface. The aluminum hydroxide is an aluminum compound having a hydroxyl group. The aluminum hydroxide film 2d is made of, for example, boehmite. The aluminum hydroxide film 2d may contain other hydroxides of aluminum, for example, aluminum hydroxide and γ-alumina in addition to boehmite.

The resin member 3 partially applied into the asperities 2b is bonded to the aluminum member 2. Such a structure is formed by injection molding using a mold 20, which will be described later. The composite member 1 may be bonded using techniques other than injection molding, for example, press forming, vibration bonding, and ultrasonic bonding.

As described above, the composite member 1 according to the present embodiment has the asperities 2b on the surface 2a of the aluminum member 2 that is in direct contact with the resin member 3, thereby producing the anchor effect. Furthermore, the aluminum hydroxide film 2d is formed on the surface 2a of the aluminum member 2. An oxygen atom of the hydroxyl group of the aluminum hydroxide film 2d and a hydrogen atom contained in resin form a hydrogen bond. Thus, a chemical bond is formed between the surface 2a of the aluminum member 2 and the resin member 3, thereby improving bonding strength. Furthermore, the surface 2a the aluminum member 2 on which the aluminum hydroxide film 2d is formed has pores of several tens to several hundreds nm, thereby enhancing the anchor effect. Hence, the composite member 1 has high bonding strength.

[Method of Manufacturing the Composite Member]

Figure 3:
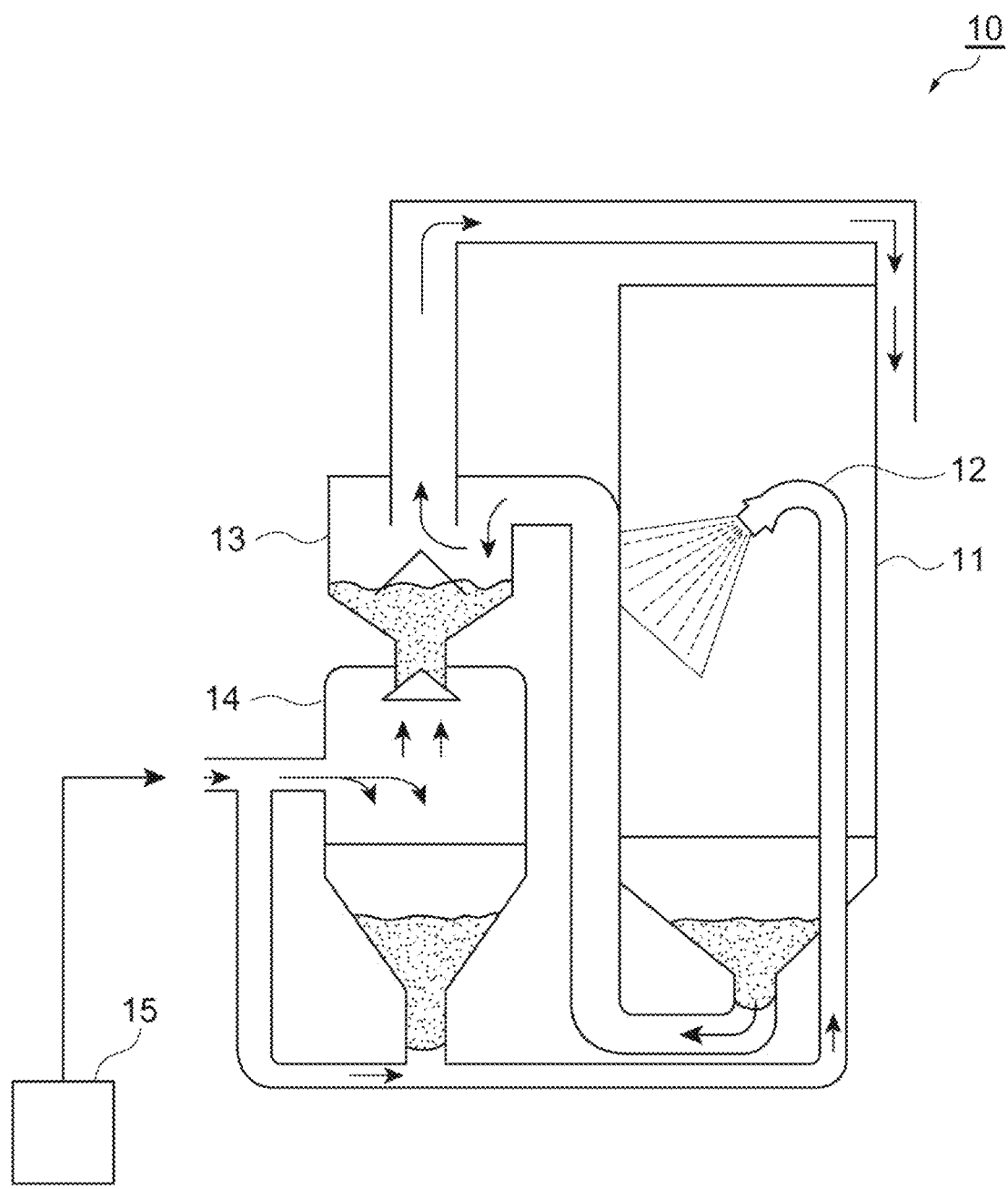
FIG. 3 is a conceptual diagram illustrating a blasting machine used for a method of manufacturing the composite member according to the embodiment.

The outline of a machine used for the method of manufacturing the composite member 1 will be described below. The machine for blasting the surface of the aluminum member 2 will be first discussed below. The blasting machine may be any type of a gravity (suction) air-blast machine, a straight-hydraulic (pressure) air-blast machine, and a centrifugal blasting machine. In the manufacturing method according to the present embodiment, a so-called straight-hydraulic (pressure) air-blast machine is used as an example. FIG. 3 is a conceptual diagram illustrating a blasting machine 10 used for the method of manufacturing the composite member 1. The blasting machine 10 includes a blast chamber 11, a blast nozzle 12, a storage tank 13, a pressure chamber 14, a compressed-air feeder 15, and a dust collector (not illustrated).

The blast nozzle 12 is stored in the blast chamber 11 and blasting is performed on a workpiece (aluminum member 2) in the blast chamber 11. A blast material from the blast nozzle 12 falls with dust to the bottom of the blast chamber 11. The fallen blast material is fed into the storage tank 13 and the dust is fed into the dust collector. The blast material stored in the storage tank 13 is fed into the pressure chamber 14 and then the pressure chamber 14 is pressurized by the compressed-air feeder 15. The blast material stored in the pressure chamber 14 is fed with compressed air into the blast nozzle 12. In this way, the workpiece undergoes blasting while the blast material is circulated.

Figure 4:
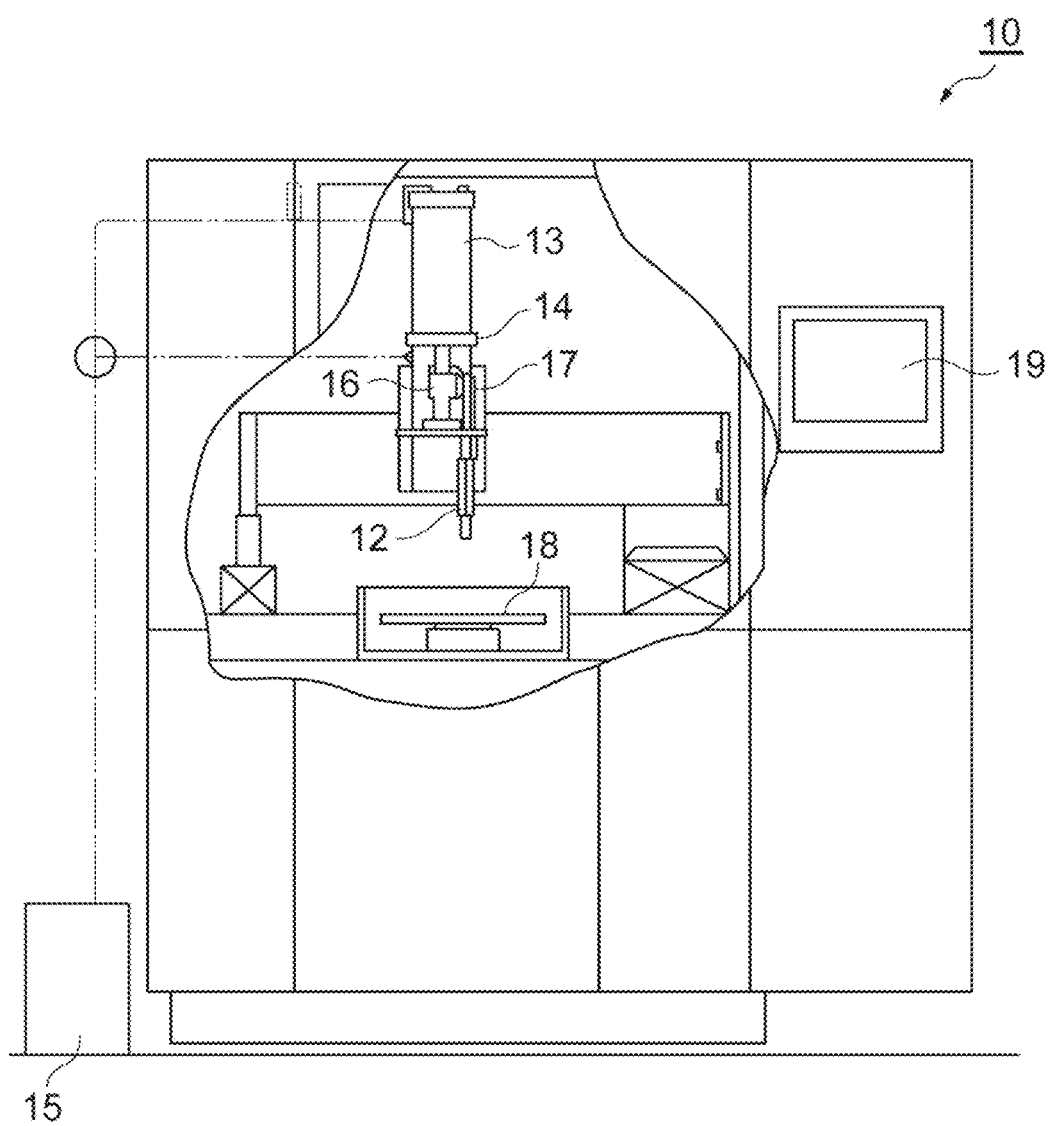
FIG. 4 is an explanatory drawing illustrating the configuration of the blasting machine used for the method of manufacturing the composite member according to the embodiment.

FIG. 4 is an explanatory drawing illustrating the configuration of the blasting machine 10 used for the method of manufacturing the composite member 1 according to the embodiment. The blasting machine 10 in FIG. 4 is the straight-hydraulic blasting machine illustrated in FIG. 3. In FIG. 4, the wall surface of the blast chamber 11 is partially omitted.

As illustrated in FIG. 4, the blasting machine 10 includes the blast-material storage tank 13 and the pressure chamber 14 that are connected to the compressed-air feeder 15 and have sealed structures, a fixed-quantity feeding part 16 communicating with the storage tank 13 in the pressure chamber 14, the blast nozzle 12 communicating with the fixed-quantity feeding part 16 via a connecting pipe 17, a work table 18 that can move while holding a workpiece below the blast nozzle 12, and a control unit 19.

The control unit 19 controls the constituent elements of the blasting machine 10. The control unit 19 includes, for example, a display unit and a processing unit. The processing unit is a typical computer including a CPU and a storage unit. The control unit 19 controls a feed rate from the compressed-air feeder 15 that feeds compressed air to the storage tank 13 and the pressure chamber 14 based on a set blast pressure and a set blast velocity. Moreover, the control unit 19 controls the position of a blast from the blast nozzle 12 based on a distance between the set workpiece and the nozzle and the workpiece scanning conditions (including a speed, a feed pitch, and the number of scans) of the workpiece. As a specific example, the control unit 19 controls the position of the blast nozzle 12 by using a scanning speed (X direction) and a feed pitch (Y direction) that are set before blasting. The control unit 19 controls the position of the blast nozzle 12 by moving the work table 18 holding the workpiece.

Figure 5:
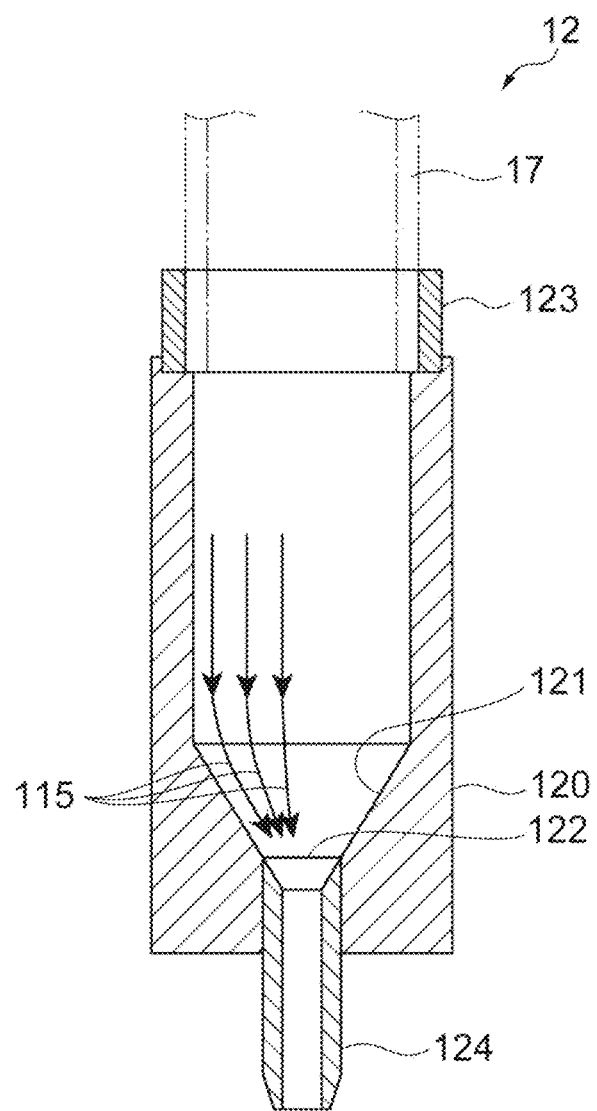
FIG. 5 is a cross-sectional view of the blast nozzle illustrated in FIG. 4.

FIG. 5 is a cross-sectional view of the blast nozzle 12 illustrated in FIG. 4. The blast nozzle 12 has a blast-tube holder 120 serving as a body part. The blast-tube holder 120 is a cylindrical member having a space for passing the blast material and compressed air therein. One end of the blast-tube holder 120 is a blast-material inlet port 123 and the other end of the blast-tube holder 120 is a blast-material outlet port 122. The blast-tube holder 120 includes a convergence acceleration part 121 that is conical with an angle of tilt, the convergence acceleration part 121 having an inner wall surface tapering from the blast-material inlet port 123 toward the blast-material outlet port 122. A cylindrical blast tube 124 communicates with the blast-material outlet port 122 of the blast-tube holder 120. The convergence acceleration part 121 tapers from the midpoint of the cylindrical shape of the blast-tube holder 120 toward the blast tube 124. This forms a compressed airflow 115.

The connecting pipe 17 of the blasting machine 10 is connected to the blast-material inlet port 123 of the blast nozzle 12. This forms a blast material passage that sequentially connects the storage tank 13, the fixed-quantity feeding part 16 in the pressure chamber 14, the connecting pipe 17, and the blast nozzle 12.

In the blasting machine 10 configured thus, compressed air is fed from the compressed-air feeder 15 to the storage tank 13 and the pressure chamber 14 after the quantity of compressed air is controlled by the control unit 19. Subsequently, the blast material in the storage tank 13 is quantitatively determined by the fixed-quantity feeding part 16 in the pressure chamber 14 with a constant pressure flow force, the blast material is fed into the blast nozzle 12 through the connecting pipe 17, and then the blast material is directed from the blast tube of the blast nozzle 12 onto the work surface of the workpiece. Thus, a fixed quantity of the blast material is always directed onto the work surface of the workpiece. Subsequently, the position of a blast directed from the blast nozzle 12 onto the work surface of the workpiece is controlled by the control unit 19 and then the workpiece undergoes blasting.

The directed blast material and cut powder generated by blasting are sucked by the dust collector, which is not illustrated. On a passage from the blast chamber 11 to the dust collector, a classifier, which is not illustrated, is disposed to separate a reusable blast material and other fine powder (blast material not in a reusable size or cut powder generated by blasting). The reusable blast material is stored in the storage tank 13 and then is fed into the blast nozzle 12 again. The fine powder is collected by the dust collector.

Figure 6:
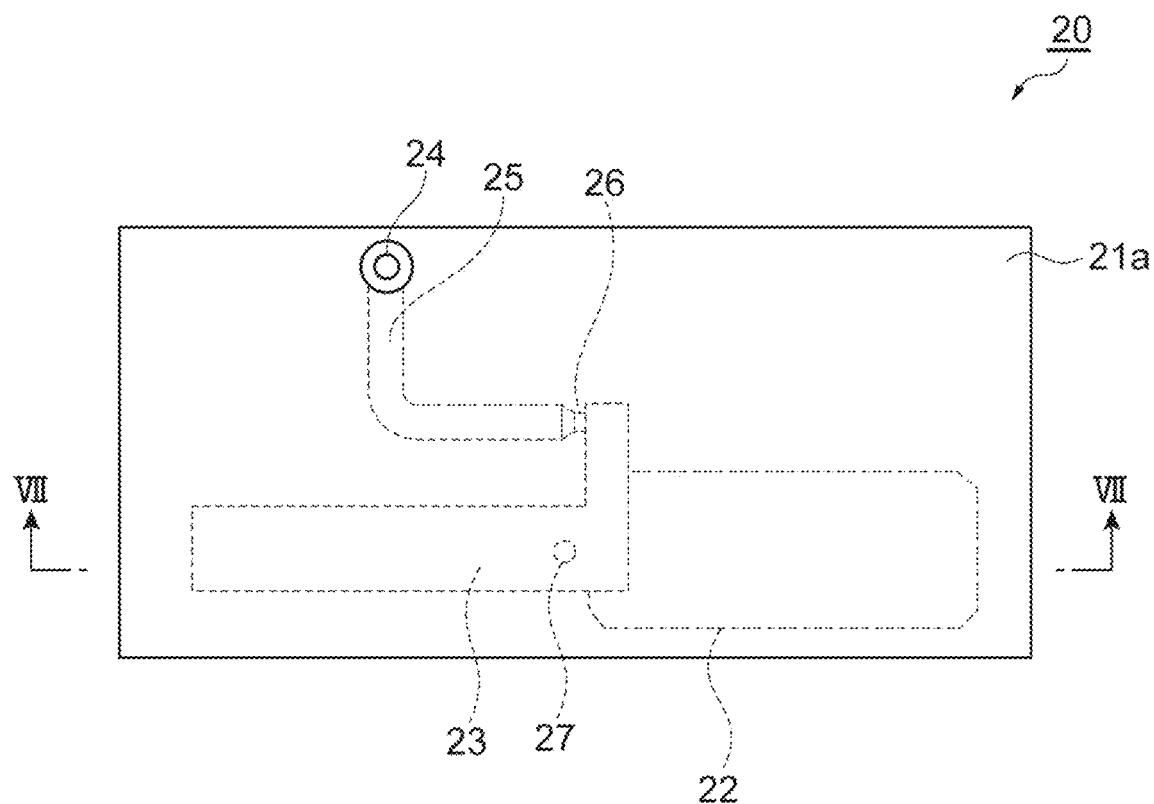
FIG. 6 is a top view of a mold used for injection molding.
Figure 7:
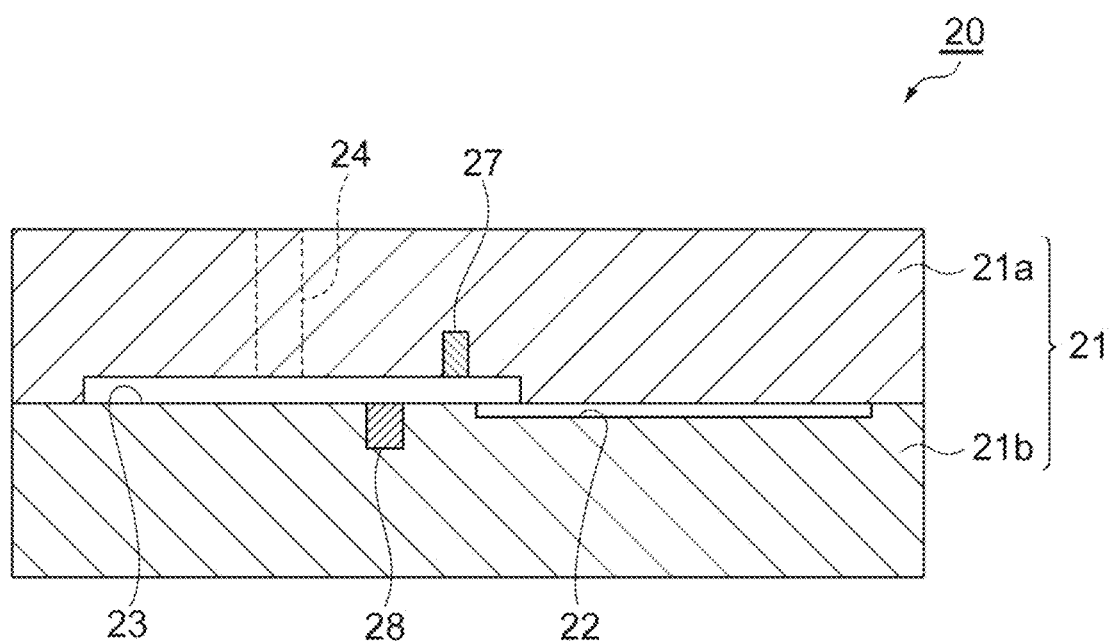
FIG. 7 is a cross-sectional view of the mold taken along line VII-VII of FIG. 6.

Injection molding will be described below. In this case, insert molding is used as injection molding. In insert molding, an insert is placed into a predetermined mold and then resin is injected and is cured after being retained for a predetermined period of time. Thereafter, the residual stress of the resin is removed by heat treatment. FIG. 6 is a top view of the mold used for injection molding. FIG. 7 is a cross-sectional view of the mold taken along line VII-VII of FIG. 6. As illustrated in FIGS. 6 and 7, a mold 20 includes a mold body 21 (a cope 21a and a drag 21b). Between the cope 21a and the drag 21b, a space 22 for placing the insert (in this configuration, the aluminum member 2) and a space 23 for injecting resin are provided. On the top surface of the cope 21a, a resin inlet is provided. The resin inlet communicates with the space 23 through a sprue 24, a runner 25, and a gate 26. A pressure sensor 27 and a temperature sensor 28 are provided in the space 23 and detect a pressure and a temperature in the space 23. Based on the detection results of the pressure sensor 27 and the temperature sensor 28, the parameters of a molding machine, which is not illustrated, are adjusted and then a molded article is manufactured. The parameters include a mold temperature, a temperature of resin being charged, a charging pressure, an injection rate, a retention time, a pressure during retention, a heat treatment temperature, and a heat treatment time. The article molded by the mold 20 has a lap joint structure that is joined with a predetermined structure.

Figure 8:
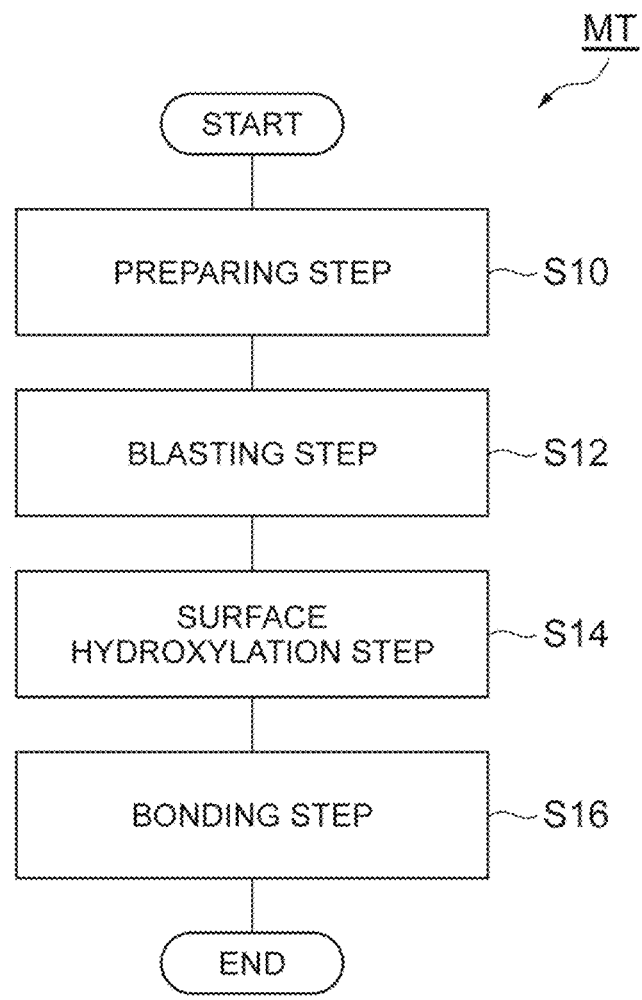
FIG. 8 is a flowchart of the method of manufacturing the composite member according to the embodiment.

The flow of the method of manufacturing the composite member 1 will be described below. FIG. 8 is a flowchart of a method MT of manufacturing the composite member 1 according to the embodiment. As depicted in FIG. 8, first, a predetermined blast material is charged into the blasting machine 10 as a preparing step (S10). The particle size of the blast material (abrasive grain) is, for example, 30 µm to 710 µm. The smaller the particle size of the blast material, the smaller mass of the blast material. This leads to a small inertial force. Thus, if the particle size of the blast material is smaller than 30 µm, it is difficult to form the asperities 2b in desired shapes. Moreover, the aluminum member 2 to be industrially used is typically stored in the atmosphere and the surface of the aluminum member 2 is covered with an uneven aluminum amorphous oxide film having a thickness of 60 nm to 300 nm. Hence, surface etching using a chemical agent and surface laser beam machining may cause uneven surface treatment because of the aluminum amorphous oxide film. In order to uniformly modify the surface of the aluminum member 2 in a surface hydroxylation step, which will be discussed later, the aluminum amorphous oxide film needs a thickness of about 30 nm or less. However, if the particle diameter of the blast material exceeds 710 µm, it is difficult to grind the aluminum amorphous oxide film to a thickness of about 30 nm or less. Hence, an aluminum oxide formed on the surface of the aluminum member 2 cannot be sufficiently removed. The asperities can be formed and the aluminum amorphous oxide film can be removed if abrasive grains have a particle size of 30 μm to 710 μm.

The control unit 19 of the blasting machine 10 acquires blasting conditions as the preparing step (S10). The control unit 19 acquires the blasting conditions based on an operation by an operator or information stored in the storage unit. The blasting conditions include a blast pressure, a blast velocity, a distance between nozzles, and workpiece scanning conditions (a speed, a feed pitch, and the number of scans). The blast pressure is, for example, 0.5 to 2.0 MPa. The lower the blast pressure, the smaller the inertial force. Thus, if the blast pressure is smaller than 0.5 MPa, it is difficult to form the asperities 2b in desired shapes. The higher the blast pressure, the larger the inertial force. Hence, the blast material is likely to be crushed by a collision with the aluminum member 2. This leads to the following problems: (1) poor working efficiency caused by the dispersion of collision energy in a process other than the formation of the asperities 2b and (2) high cost because the blast material considerably wears. Such problems become apparent when the blast pressure exceeds 2.0 MPa. The control unit 19 precisely performs micro-order or nano-order control on the size, depth, and density of the asperities 2b on the surface 2a of the aluminum member 2 by managing the blasting conditions. The blasting conditions may include a condition for specifying a blasting region. In this case, selective surface treatment is achieved.

Figure 9:
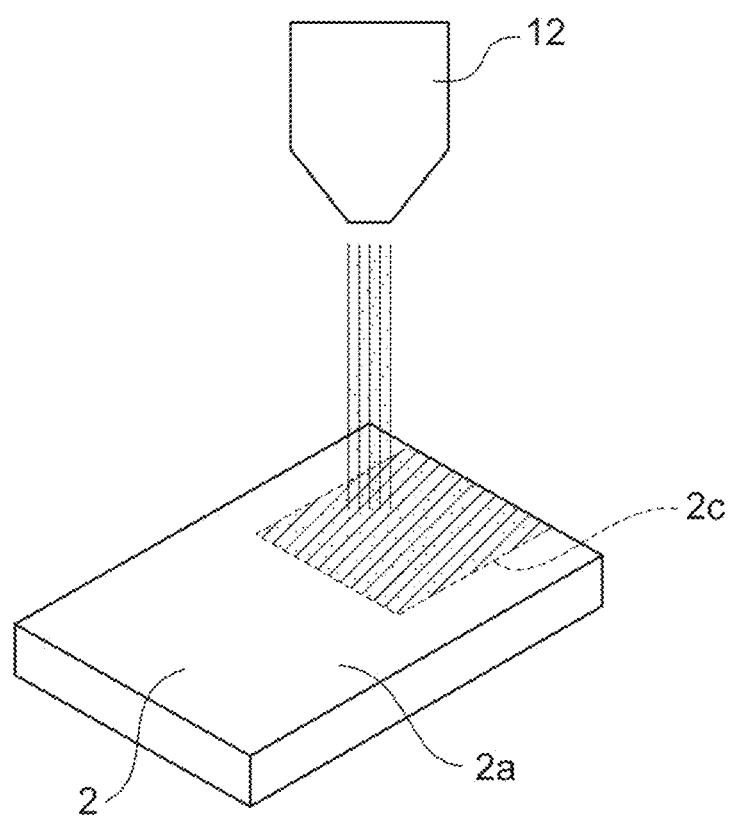
FIG. 9 is a conceptual diagram of blasting.
Figure 10:
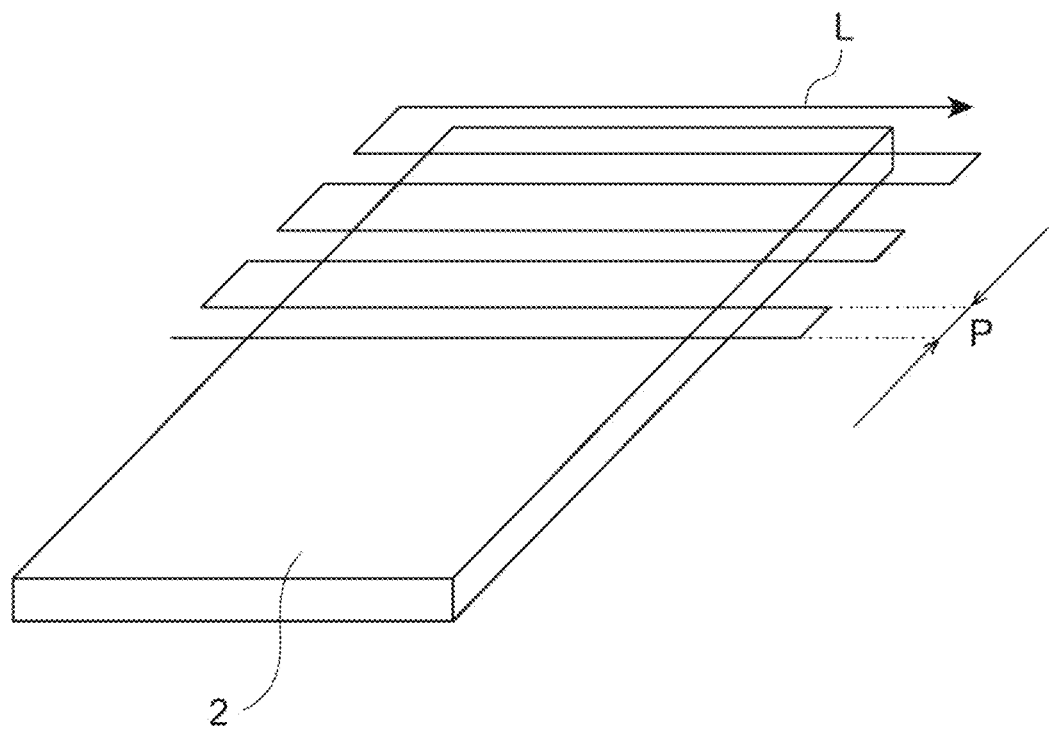
FIG. 10 is an explanatory drawing of a scan of blasting.

Subsequently, the blasting machine 10 performs a series of processing as a blasting step (S12) as follows: First, the aluminum member 2 that is a target of blasting is set on the work table 18 in the blast chamber 11. The control unit 19 then activates the dust collector, which is not illustrated. The dust collector reduces a pressure in the blast chamber 11 to a negative pressure based on the control signal of the control unit 19. Thereafter, based on the control signal of the control unit 19, the blast nozzle 12 sends a blast of the blast material as a solid/gas two-phase flow of compressed air at a blast pressure of 0.5 to 2.0 MPa. The control unit 19 then activates the work table 18 and moves the aluminum member 2 into a blast flow of the solid/gas two-phase flow (below the blast nozzle in FIG. 4). FIG. 9 is a conceptual diagram of blasting. As illustrated in FIG. 9, the blast material is jetted from the blast nozzle 12 to a partial region 2c of the surface 2a of the aluminum member 2. At this point, the control unit 19 continuously activates the work table 18 such that a blast flow draws a predetermined path on the aluminum member 2. FIG. 10 is an explanatory drawing of a scan of blasting. As illustrated in FIG. 10, the control unit 19 operates the work table 18 according to a path L for scanning with the feed pitch P. This forms the micro-order or nano-order asperities 2b on the surface of the aluminum member 2 as desired.

By blasting using the blast material having a particle size of 30 to 710 μm at a blast pressure of 0.5 to 2.0 MPa, the micro-order or nano-order asperities 2b are formed on the surface 2a of the aluminum member 2 as desired (for example, the asperities 2b having an arithmetic mean inclination RAa and a root-mean-square inclination RAq that are controlled to 0.17 to 0.50 and 0.27 to 0.60, respectively). Furthermore, the amorphous oxide film on the surface of the aluminum member 2 has a thickness of about 9 nm or less. After the operation of the blasting machine 10 is stopped, the aluminum member 2 is removed and blasting is completed.

Figure 11A:
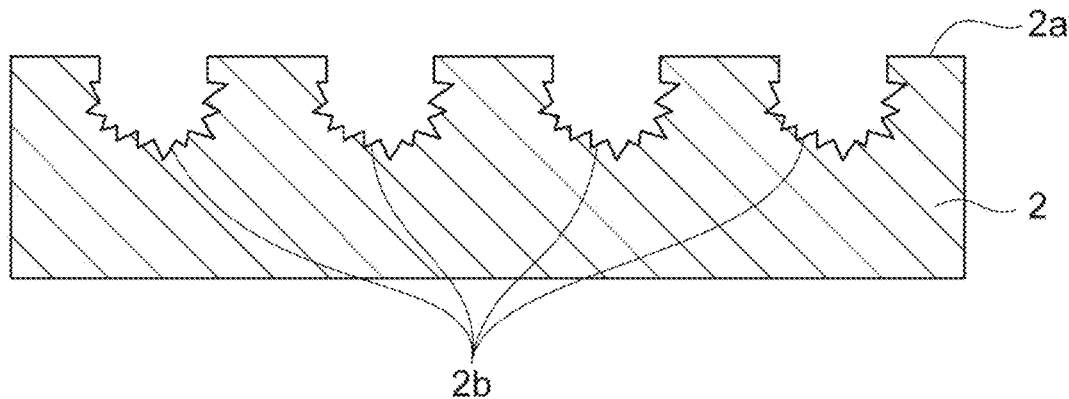
FIGS. 11A-11C are explanatory drawings of the manufacturing process of the composite member.
Figure 11B:
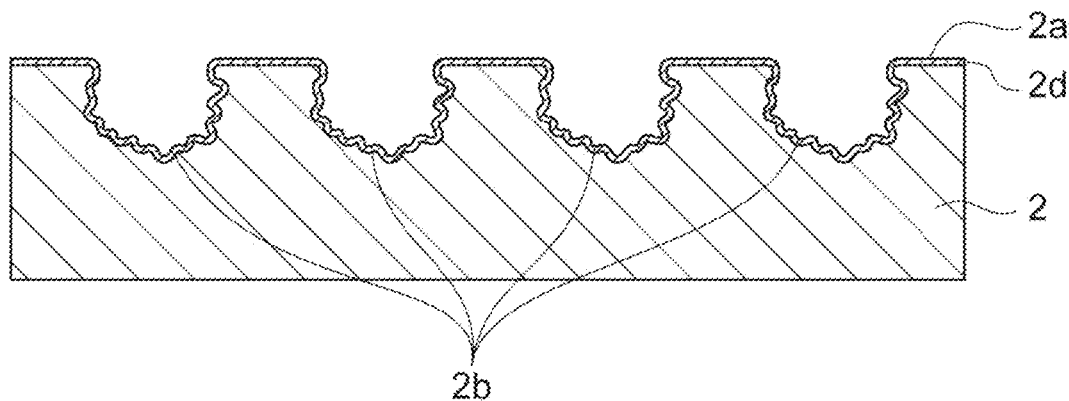
Figure 11C:
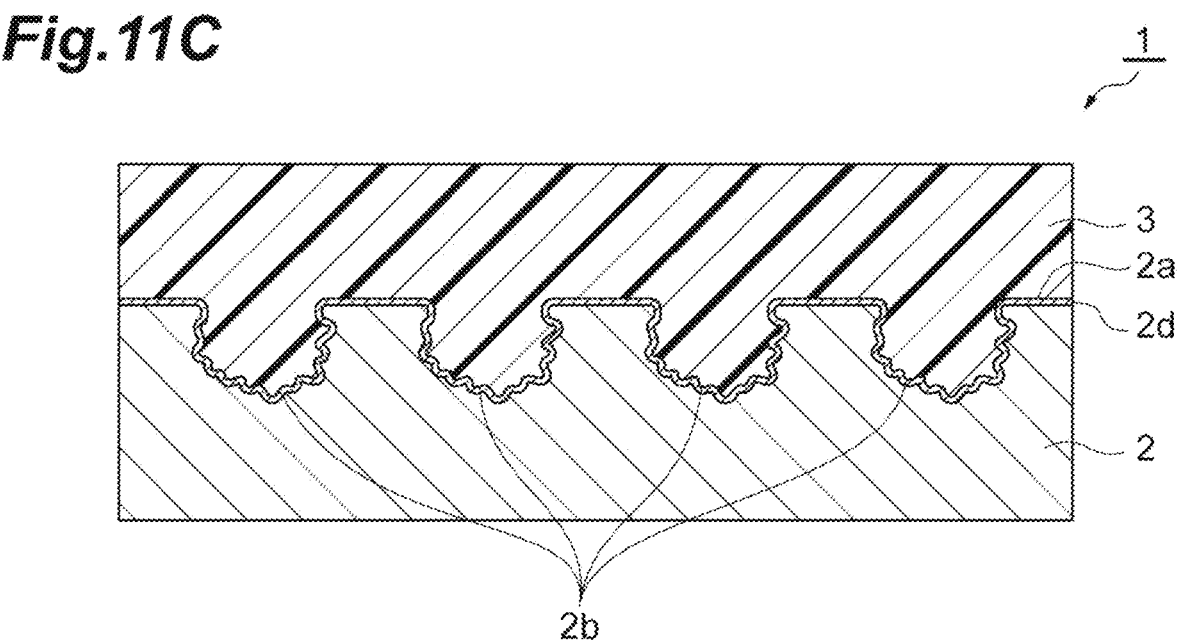

FIGS. 11A-11C are explanatory drawings of the manufacturing process of the composite member. As illustrated in FIG. 11A, the asperities 2b of the surface 2a of the aluminum member 2 have sharp projections after blasting.

Subsequently, as the surface hydroxylation step (S14), the surface 2a of the aluminum member 2 having undergone blasting is caused to react with water by using at least one of heat and plasma and the surface 2a of the aluminum member 2 is modified into aluminum hydroxide. In the surface hydroxylation step, the surface 2a of the aluminum member 2 is caused to react with water by using one of hydrothermal treatment, steam treatment, superheated steam treatment, liquid plasma, and atmospheric-pressure plasma containing water. An example of hydrothermal treatment will be described below. In hydrothermal treatment, the aluminum member 2 having undergone blasting is immersed in pure water, which is heated to at least 70° C., for a predetermined period. Thus, as illustrated in FIG. 11B, the asperities 2b are rounded. Furthermore, the surface 2a of the aluminum member 2 is mainly modified into boehmite, thereby forming the aluminum hydroxide film 2d. The aluminum hydroxide film 2d may contain other hydroxides of aluminum, for example, aluminum hydroxide and γ-alumina in addition to boehmite. A water temperature may be 70° C. or higher also in steam treatment, superheated steam treatment, liquid plasma, and atmospheric-pressure plasma containing water. The water temperature may be 300° C. or less in view of suppression of modification of aluminum.

In the surface hydroxylation step, the surface of the aluminum member may be cleaned with water. If the surface hydroxylation step is performed in hydrothermal treatment, the surface of the aluminum member is cleaned with water, thereby reducing a surface carbon concentration. Hydrothermal treatment and ultrasonic cleaning may be combined to positively reduce the surface carbon concentration. For example, pure water is irradiated with ultrasonic waves while the aluminum member 2 is immersed in the pure water heated to at least 70° C. This can simultaneously perform hydrothermal treatment and surface washing.

Subsequently, the molding machine, which is not illustrated, performs molding using the mold 20 as a bonding step (S16). The mold 20 is first opened, the aluminum member 2 with the surface modified to aluminum hydroxide is placed into the space 22, and then the mold 20 is closed. The molding machine then injects dissolved resin, which has a set resin temperature, into the mold 20 from the resin inlet. The injected resin passes through the sprue 24, the runner 25, and the gate 26 and is charged into the space 23. The molding machine controls the charging pressure and the injection rate of resin based on the detection result of the pressure sensor 27. The molding machine controls a mold temperature to a set value based on the detection result of the temperature sensor 28. Moreover, the molding machine controls a pressure to the set value during the set retention time based on the detection result of the pressure sensor 27. Thereafter, the molding machine performs heat treatment based on a set heat-treatment temperature and a set heat-treatment time. The molding machine then opens the mold 20 and removes the composite member 1 in which the aluminum member 2 and the resin member 3 have been integrated. At the end of the bonding step (S16), the flowchart in FIG. 8 is completed. The composite member 1 in FIG. 11C is manufactured thus.

As described above, according to the manufacturing method MT, blasting is performed on the surface 2a of the aluminum member 2. The asperities 2b having sharp projections are formed on the surface 2a of the aluminum member 2 having undergone blasting. Thereafter, the surface 2a of the aluminum member 2 is mainly modified into boehmite. Thus, the sharp projections are rounded. The resin member 3 is directly bonded to the surface 2a of the aluminum member 2 modified to aluminum hydroxide. The resin member 3 is applied into the rounded asperities 2b and is cured therein. As described above, according to the manufacturing method MT, sharp projections that may break the resin member 3 can be removed by the surface hydroxylation step (S14), thereby improving the bonding strength of the composite member 1. Moreover, on the surface of the aluminum member 2, an oxygen atom of a hydroxyl group of boehmite and a hydrogen atom contained in the resin mainly form a hydrogen bond. Thus, a chemical bond is formed between the surface 2a of the aluminum member 2 and the resin member 3, thereby improving the bonding strength. Furthermore, the surface 2a the aluminum member 2 mainly composed of boehmite has pores of several tens to several hundreds mu. This can enhance the anchor effect. Moreover, an aluminum oxide film formed on the surface 2a of the aluminum member 2 is removed by blasting. An aluminum oxide film may interfere with the formation of the aluminum hydroxide film 2d. According to the manufacturing method MT, an aluminum oxide film is removed before aluminum hydroxide is formed, thereby uniformly modifying the surface 2a of the aluminum member 2 into aluminum hydroxide.

According to the manufacturing method MT, the surface 2a of the aluminum member 2 is cleaned with water used for modification to aluminum hydroxide, thereby suppressing a reduction in bonding strength when the bonding strength is reduced by contamination with carbon. According to the manufacturing method MT, the particle size of abrasive grains used for the blasting step is 30 μm to 710 μm, so that an oxide film formed on the surface 2a of the aluminum member 2 can be properly removed. This can form a uniform boehmite film on the surface 2a of the aluminum member 2.

The foregoing embodiment does not limit the present invention. As a matter of course, the present invention can be modified in various ways without departing from the scope of the invention.

[Modification of the Base Material and the Resin Member]

The aluminum member 2 and the resin member 3 were described as plate members in the embodiment. The shapes are not limited and any shapes can be used as long as the members can be brought into contact with each other. The resin member 3 according to the embodiment is in contact with a part of the surface of the aluminum member 2. The resin member 3 may be brought into contact with the overall surface of the aluminum member 2.

[Modification of Injection Molding]

Injection molding is not limited to insert molding and outsert molding may be used instead.

Example

[Grain Size of the Blast Material]

First, the thickness of the oxide film of the aluminum member 2 was measured before the blasting step (S12) was performed. The aluminum oxide film was analyzed in the depth direction by using Auger electron spectroscopy (AES). An oxide and a metal component were simultaneously detected around an oxide/metal interface and thus were separated by a spectral synthesis method, so that the thickness of the oxide film was determined. The oxide film was 72 nm in thickness. Subsequently, the blasting step (S12) was performed using the blasting machine illustrated in FIGS. 3 to 5 and then the thickness of the oxide film of the aluminum member 2 was measured. In the case of a blast material in which abrasive grains had a center particle size of 600 μm to 710 μm, an oxide film was 13 nm in thickness. In the case of a blast material in which abrasive grains had a center particle size of 41 μm to 50 μm (a maximum particle size of 127 μm or less and a mean particle size of 57 μm±3 μm), an oxide film was 9 nm in thickness. Thus, it was confirmed that the oxide film of the surface 2a of the aluminum member 2 can be removed by using the blast material of at least 710 μm.

[Confirmation of Surface State of the Aluminum Member]

The blasting step (S12) was performed by using the blasting machine illustrated in FIGS. 3 to 5. An aluminum plate (Japanese Industrial Standards (JIS): A5052) was used as the aluminum member. The blast material containing alumina with an abrasive-grain center particle size of 106 μm to 125 μm was used for blasting. The blast pressure was 1.0 MPa. After the blasting step, the surface was observed using a field emission scanning electron microscope (FE-SEM).

Subsequently, the surface hydroxylation step (S14) was performed. The aluminum plate having undergone blasting was immersed in pure water at 90° C. for five minutes. The surface was then observed by using the field emission scanning electron microscope (FE-SEM).

Figure 12A:
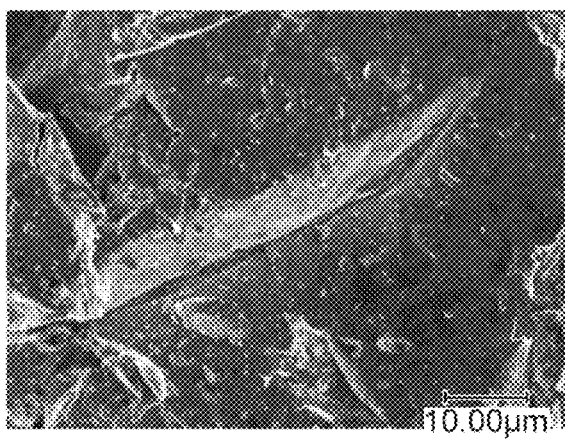
FIGS. 12A-12F indicate the surface observation results of the aluminum member.
Figure 12B:
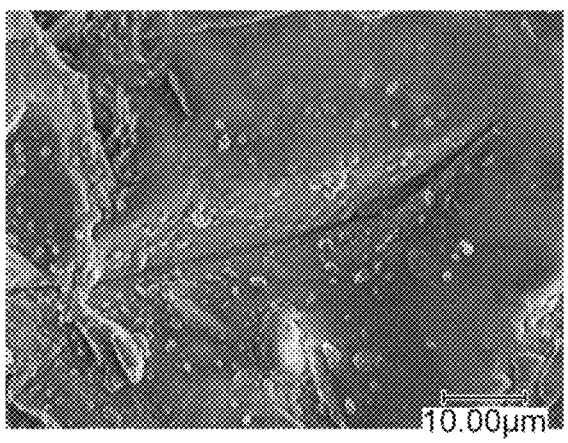
Figure 12C:
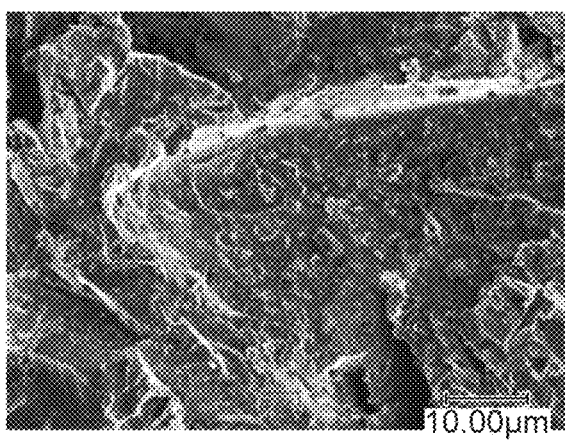
Figure 12D:
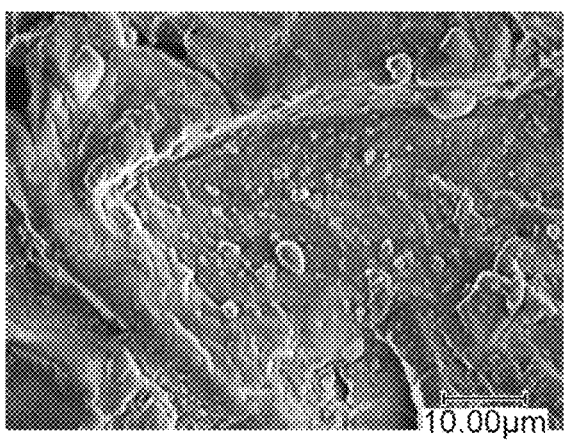
Figure 12E:
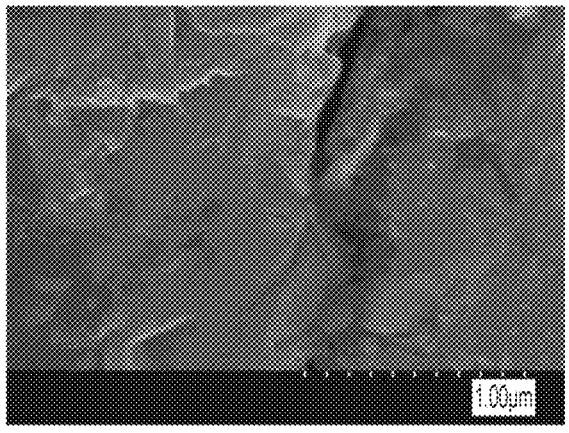
Figure 12F:
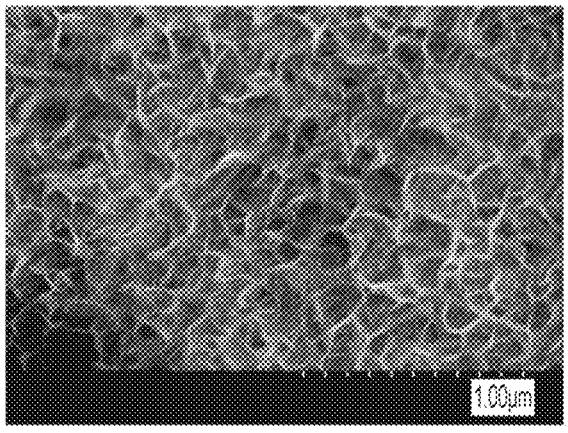

FIGS. 12A-12F indicate the surface observation results of the aluminum member. FIG. 12A indicates the surface observation result of the aluminum plate after the blasting step (S12). FIG. 12B indicates the surface observation result of the aluminum plate after the surface hydroxylation step (S14). Similarly, FIGS. 12C and 12E indicate the surface observation results of the aluminum plate after the blasting step (S12). FIGS. 12D and 12F indicate the surface observation results of the aluminum plate after the surface hydroxylation step (S14).

As indicated in FIGS. 12A and 12C, it was confirmed that the surface 2a of the aluminum member 2 had asperities and sharp projections after the blasting step (S12). In contrast, as indicated in FIGS. 12B and 12D, it was confirmed that the surface 2a of the aluminum member 2 was entirely rounded after the blasting step (S12). As is evident from a comparison between FIGS. 12E and 12F, it was confirmed that the surface of the aluminum plate had pores of several tens to several hundreds nm after the surface hydroxylation step (S14).

[Confirmation of Surface Composition of the Aluminum Member]

[Example: Surface Treated Article]

The blasting step (S12) was performed by using the blasting machine illustrated in FIGS. 3 to 5. An aluminum plate (JIS: A5052) was used as an aluminum member. The blast material containing alumina with an abrasive-grain center particle size of 106 μm to 125 μm was used for blasting. The blast pressure was 1.0 MPa. Subsequently, the surface hydroxylation step (S14) was performed. The aluminum plate having undergone blasting was immersed in pure water at 90° C. for five minutes.

[Comparative Example: Untreated Article]

The blasting step (S12) and the surface hydroxylation step (S14) were not performed on an aluminum plate (JIS: A5052).

The surface compositions of the surface treated article and the untreated article were analyzed using Fourier transform infrared spectroscopy (FT-IR) according to attenuated total reflectance (ATR). The analysis results are indicated in FIG. 13.

Figure 13:
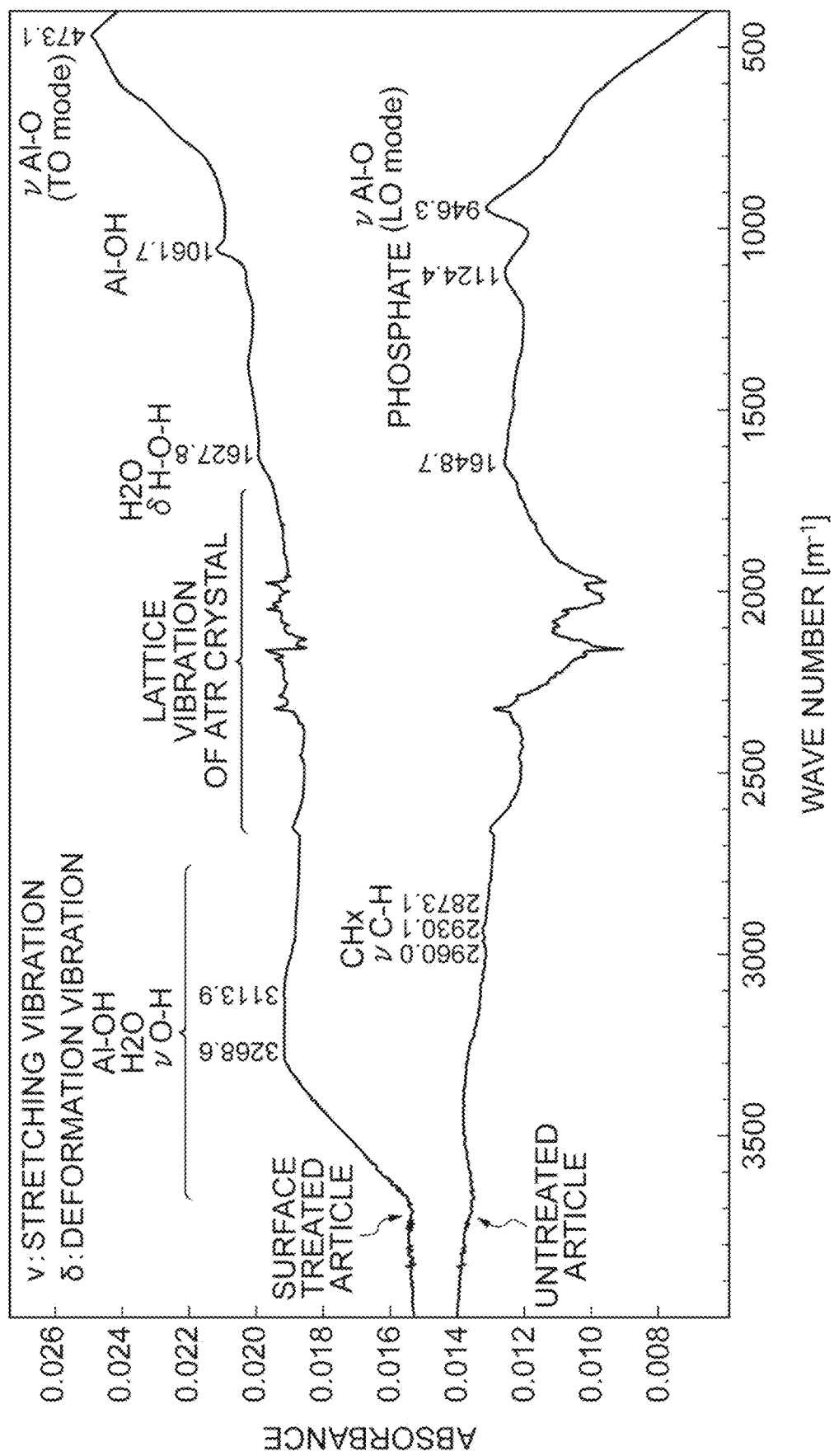
FIG. 13 indicates the analysis results of the surface compositions of aluminum members.

FIG. 13 indicates the analysis results of the surface compositions of the aluminum members. In the graph of FIG. 13, the abscissa indicates a wave number and the ordinate indicates an absorbance. Waveform data in the upper part of the graph indicates the composition analysis result of the surface treated article, whereas waveform data in the lower part of the graph indicates the composition analysis result of the untreated article. As is evident from FIG. 13, the waveform data of the untreated article reached peaks at wave numbers of 3960 $m^{-1}$, 3930 $m^{-1}$, and 2873 $m^{-1}$ because of contamination with carbon (e.g., C—H) and a peak (Al—O) at a wave number of 946 $m^{-1}$ because of an aluminum oxide. Any peak caused by boehmite was not confirmed. In the data of the surface treated article, a peak caused by contamination with carbon (e.g., C—H) before treatment and a peak caused by an aluminum oxide (Al—O) disappeared and peaks caused by boehmite appeared at wave numbers of 3268 $m^{-1}$ and 3113 $m^{-1}$. Hence, it was confirmed that an oxide and contamination with carbon on the surface of the aluminum member 2 were removed by surface treatment and aluminum hydroxide was formed.

[Confirmation of a Surface Carbon Concentration]

The surface carbon concentration of the aluminum member 2 having undergone the surface hydroxylation step (S14) and the surface carbon concentration of the untreated article were measured and compared with each other. For the measurement, X-ray photoelectron spectroscopy (XPS) was used. Consequently, the surface carbon concentration of the untreated article was 40 at %, whereas the aluminum member 2 having undergone the surface hydroxylation step (S14) had a surface carbon concentration of 8 at %. Thus, a cleaning effect was confirmed as a secondary effect of hydrothermal treatment.

[Confirmation of Shearing Strength]

An example and comparative examples 1 to 3 were prepared to confirm shearing strength.

Example

The blasting step (S12) was performed by using the blasting machine illustrated in FIGS. 3 to 5. An aluminum plate (JIS: A5052) was used as an aluminum member. The blast material containing alumina with an abrasive-grain center particle size of 106 µm to 125 µm was used for blasting. The blast pressure was 1.0 MPa. Subsequently, the surface hydroxylation step (S14) was performed. The aluminum plate having undergone blasting was immersed in pure water at 90° C. for five minutes. Thereafter, the bonding step (S16) was performed. The resin member 3 was bonded to the aluminum member 2 by using the mold 20 illustrated in FIGS. 6 and 7. The resin member 3 was set to have dimensions: 10 mm (L)×45 mm (W)×3.0 mm (T). Polyphenylene sulfide (PPS) was used as the material of the resin member 3. Three polyphenylene sulfides having different components were prepared as the resin member 3. During injection, a mold temperature was 150° C., an injection rate was 20 mm/s, an injection pressure was 53 to 93 MPa, and an injection time was 0.56 s. During the retention time, the retention pressure was set at 80 MPa and the retention time was set at 8 s. An overlap of 5 mm was made between the aluminum member 2 and the resin member 3.

Comparative Examples 1 to 3

In comparative example 1, an aluminum plate (JIS: A5052) having not undergone the blasting step (S12) and the surface hydroxylation step (S14) was used as an aluminum member. The bonding step (S16) was performed as in the example.

In comparative example 2, an aluminum plate (JIS: A5052) having undergone the surface hydroxylation step (S14) as in the example was used as an aluminum member without undergoing the blasting step (S12). The bonding step (S16) was performed as in the example.

In comparative example 3, an aluminum plate (JIS: A5052) having undergone the blasting step (S12) as in the example was used as an aluminum member without undergoing the surface hydroxylation step (S14). The bonding step (S16) was performed as in the example.

[Evaluation of Bonding Strength]

The shearing strengths of the example and comparative examples 1 to 3 prepared under the foregoing conditions were measured. An evaluation apparatus conducted measurements according to a testing method in conformity with ISO19095. The measurement results are shown in FIG. 14.

Figure 14:
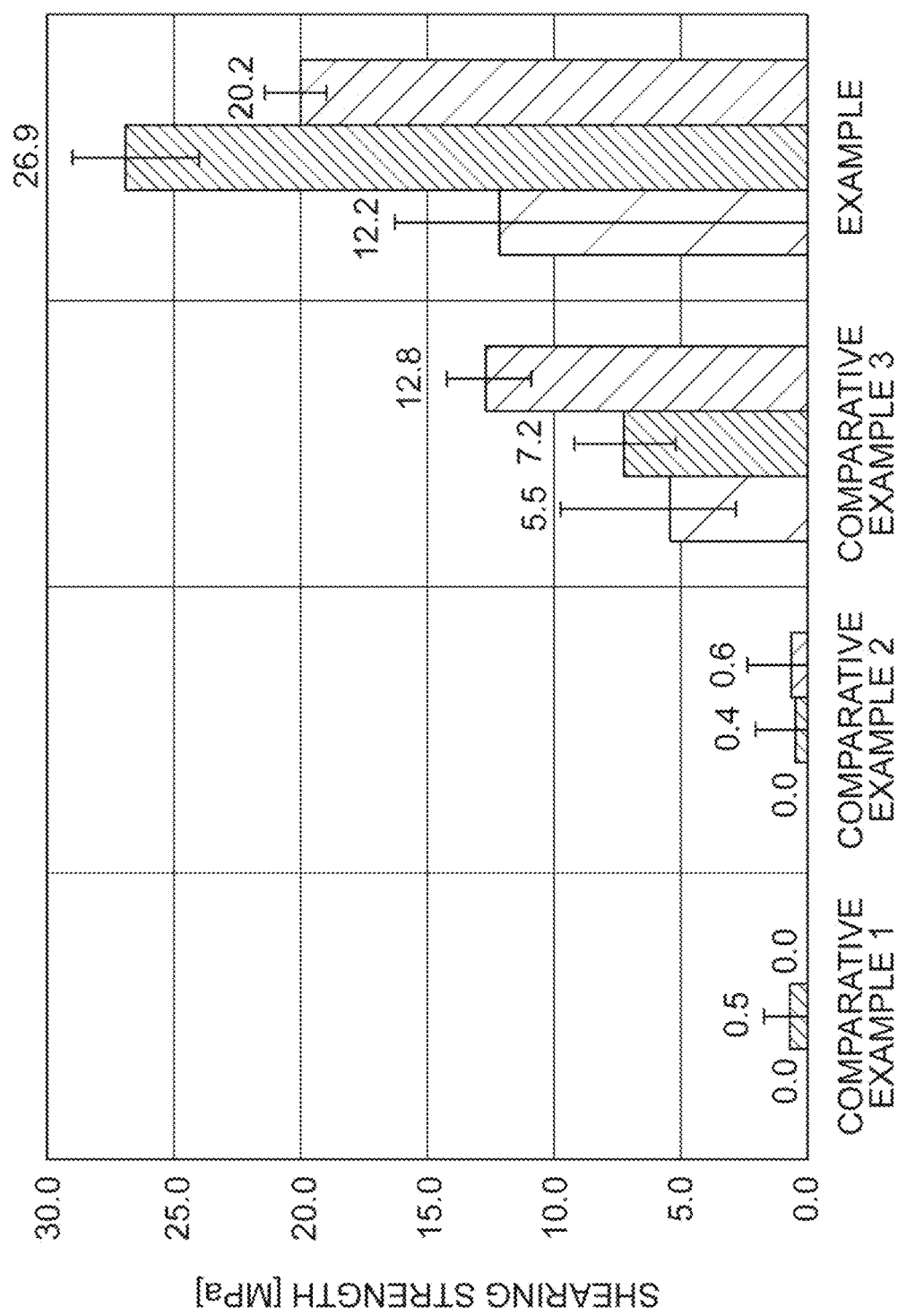
FIG. 14 indicates the measurement results of shearing strength.

FIG. 14 indicates the measurement results of shearing strength. As is evident from FIG. 14, in the example and comparative examples 1 to 3, three polyphenylene sulfides having different components were bonded and the shearing strengths were measured. The shearing strengths of comparative example 1 were "0.0", "0.5", and "0.0", the shearing strengths of comparative example 2 were "0.0", "0.4", and "0.6", the shearing strengths of comparative example 3 were "5.5", "7.2", and "12.8", and the shearing strengths of the example were "12.2", "26.9", and "20.2".

By comparing comparative example 1 and comparative example 2, it was confirmed that the shearing strength was not so remarkably improved only by the surface hydroxylation step (S14). By comparing comparative example 1 and comparative example 3, it was confirmed that the shearing strength was improved by the blasting step (S12). By comparing the example and comparative examples 1 to 3, it was confirmed that the shearing strength was remarkably improved by a combination of the blasting step (S12) and the surface hydroxylation step (S14). Moreover, all the results of the three polyphenylene sulfides have the foregoing tendency and thus it was confirmed that a combination of the blasting step (S12) and the surface hydroxylation step (S14) remarkably improved the shearing strength regardless of the material of the resin member 3.

REFERENCE SIGNS LIST

1 . . . composite member, 2 . . . aluminum member, 3 . . . resin member, 10 . . . blasting machine, 11 . . . blast chamber, 12 . . . blast nozzle, 13 . . . storage tank, 14 . . . pressure chamber, 15 . . . compressed-air feeder, 16 . . . fixed-quantity feeding part, 17 . . . connecting pipe, 18 . . . work table, 19 . . . control unit, 20 . . . mold, 21 . . . mold body

What is claimed is:

1. A method of manufacturing a composite member including an aluminum member and a resin member bonded to each other, the method comprising:

performing blasting on a surface of the aluminum member;

modifying the surface of the aluminum member into aluminum hydroxide, the modifying including causing the surface of the aluminum member having undergone blasting to react with water by using at least one of liquid plasma and atmospheric-pressure plasma containing water; and directly bonding the resin member to the surface of the aluminum member modified to the aluminum hydroxide.

2. The method according to claim 1, wherein the aluminum hydroxide is boehmite.

3. The method according to claim 2, wherein the modifying includes cleaning the surface of the aluminum member with the water.

4. The method according to claim 3, wherein abrasive grains used in the performing blasting have a particle size larger than 300 μm and less than or equal to 710 μm.

5. The method according to claim 3, wherein abrasive grains used in the performing blasting have a particle size of 600 μm to 710 μm.

6. The method according to claim 2, wherein abrasive grains used in the performing blasting have a particle size larger than 300 μm and less than or equal to 710 μm.

7. The method according to claim 2, wherein abrasive grains used in the performing blasting have a particle size of 600 μm to 710 μm.

8. The method according to claim 1, wherein the modifying includes cleaning the surface of the aluminum member with the water.

9. The method according to claim 8, wherein abrasive grains used in the performing blasting have a particle size larger than 300 μm and less than or equal to 710 μm.

10. The method according to claim 8, wherein abrasive grains used in the performing blasting have a particle size of 600 μm to 710 μm.

11. The method according to claim 1, wherein abrasive grains used in the performing blasting have a particle size larger than 300 μm and less than or equal to 710 μm.

12. The method according to claim 1, wherein abrasive grains used in the performing blasting have a particle size of 600 μm to 710 μm.

13. The method according to claim 1, wherein the performing blasting is performed so that an amorphous oxide film on the surface of the aluminum member has a thickness of 9 nm or less.

14. A method of manufacturing a composite member including an aluminum member and a resin member bonded to each other, the method comprising:

performing blasting on a surface of the aluminum member;

modifying the surface of the aluminum member into aluminum hydroxide, the modifying including causing the surface of the aluminum member having undergone blasting to react with water by using at least one of heat and plasma; and directly bonding the resin member to the surface of the aluminum member modified to the aluminum hydroxide, wherein the modifying includes irradiating ultrasonic waves to the water while the aluminum member is immersed in the water to clean the surface of the aluminum member with the water.

15. The method according to claim 14, wherein abrasive grains used in the performing blasting have a particle size larger than 300 μm and less than or equal to 710 μm.

16. The method according to claim 14, wherein abrasive grains used in the performing blasting have a particle size of 600 μm to 710 μm.

17. The method according to claim 14, wherein the performing blasting is performed so that an amorphous oxide film on the surface of the aluminum member has a thickness of 9 nm or less.

* * * * *